United States Patent
Matsuhashi et al.

(10) Patent No.: US 9,630,538 B2
(45) Date of Patent: Apr. 25, 2017

(54) SIDE SUPPORT COVER

(71) Applicant: HONDA ACCESS CORP., Niiza-shi, Saitama (JP)

(72) Inventors: Takeshi Matsuhashi, Niiza (JP); Takumi Kobayashi, Niiza (JP); Hiroshi Ando, Tokyo (JP)

(73) Assignee: HONDA ACCESS CORP., Niiza-shi (JP)

( * ) Notice: Subject to any disclaimer, the term of this patent is extended or adjusted under 35 U.S.C. 154(b) by 0 days.

(21) Appl. No.: 14/837,784

(22) Filed: Aug. 27, 2015

(65) Prior Publication Data
US 2016/0059756 A1    Mar. 3, 2016

(30) Foreign Application Priority Data

Aug. 28, 2014  (JP) ................. 2014-174603

(51) Int. Cl.
*B60N 2/60* (2006.01)
*B60N 2/58* (2006.01)
*B60N 2/44* (2006.01)

(52) U.S. Cl.
CPC ........... *B60N 2/6018* (2013.01); *B60N 2/449* (2013.01); *B60N 2/58* (2013.01); *B60N 2/5816* (2013.01); *B60N 2/5858* (2013.01); *B60N 2/60* (2013.01)

(58) Field of Classification Search
CPC .... B60N 2/6018; B60N 2/5816; B60N 2/449; B60N 2/60; B60N 2/5858; B60N 2/58
USPC .......... 297/218.4, 218.5, 228.12, 228.13
See application file for complete search history.

(56) References Cited

U.S. PATENT DOCUMENTS

| | | | | |
|---|---|---|---|---|
| 6,592,181 B2* | 7/2003 | Stiller | .............. | A47C 31/026 297/218.2 |
| 7,296,852 B2* | 11/2007 | Huse | .............. | A47C 7/021 297/218.4 |
| 7,673,939 B2* | 3/2010 | Taguchi | .............. | B60N 2/5816 297/218.4 |
| 8,500,198 B2* | 8/2013 | Sugiura | .............. | B60N 2/6009 297/228.13 |

FOREIGN PATENT DOCUMENTS

| | | | |
|---|---|---|---|
| DE | 102009024116 A1 * | 12/2010 | ......... B60N 2/6018 |
| JP | H03-69499 A | 3/1991 | |
| JP | 03-69499 U | 7/1991 | |
| JP | 2014-323 A | 1/2014 | |

OTHER PUBLICATIONS

Extended European Search Report dated Jan. 21, 2016, issued in counterpart European Application No. 15182904.1 (7 pages).

* cited by examiner

*Primary Examiner* — Anthony D Barfield
(74) *Attorney, Agent, or Firm* — Westerman, Hattori, Daniels & Adrian, LLP

(57) ABSTRACT

A side support cover for application to a vehicle seat having a backrest part is disclosed. The side support cover includes left and right cover bodies for covering respective left and right side supports, and left and right lace members with one ends attached to the respective cover bodies. The left and right lace members are connected to the left and right cover bodies at a point positioned in the vicinity of boundaries between the lace members and the side supports. The backrest part has through-holes extending through the backrest part in a front-back direction. The lace members are passed through the respective through-holes in a state of being tensioned.

4 Claims, 12 Drawing Sheets

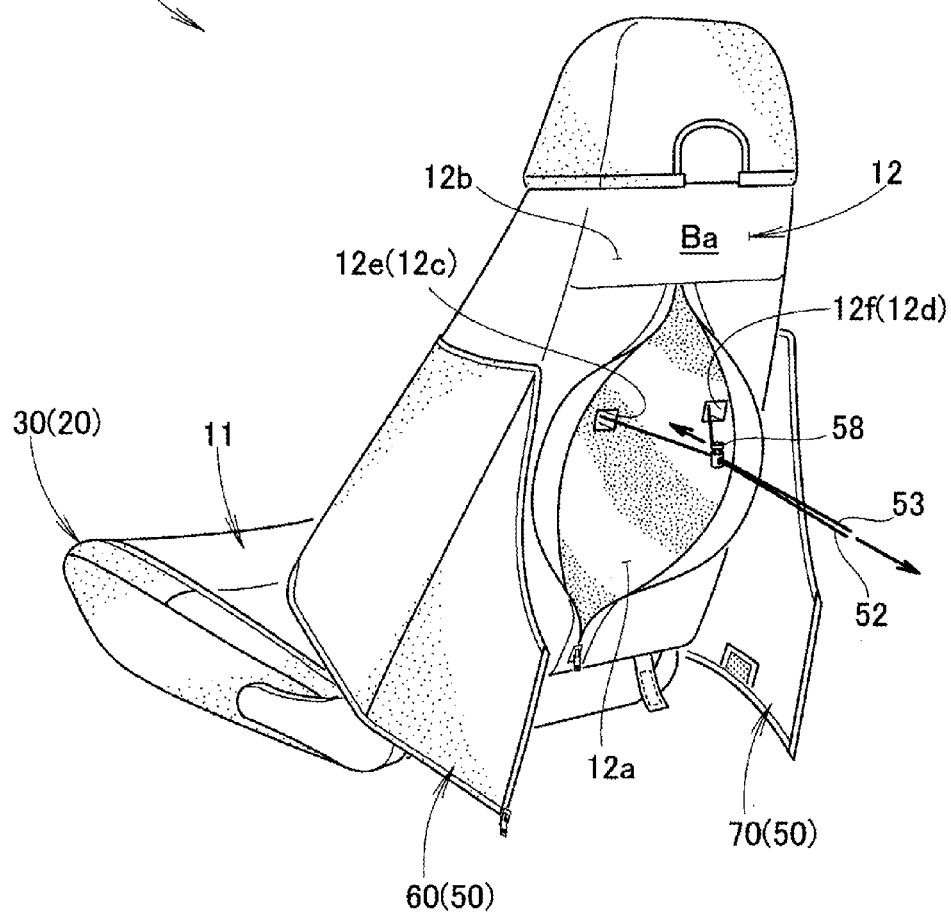

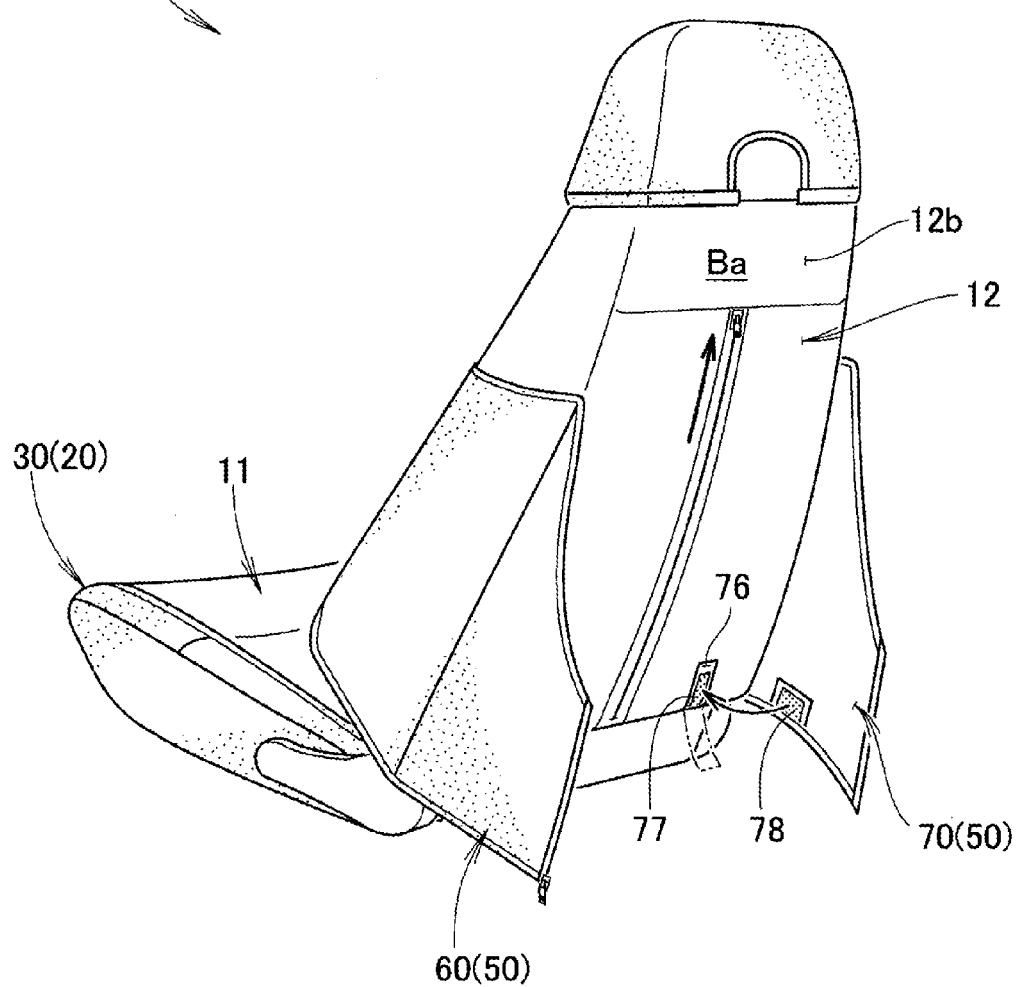

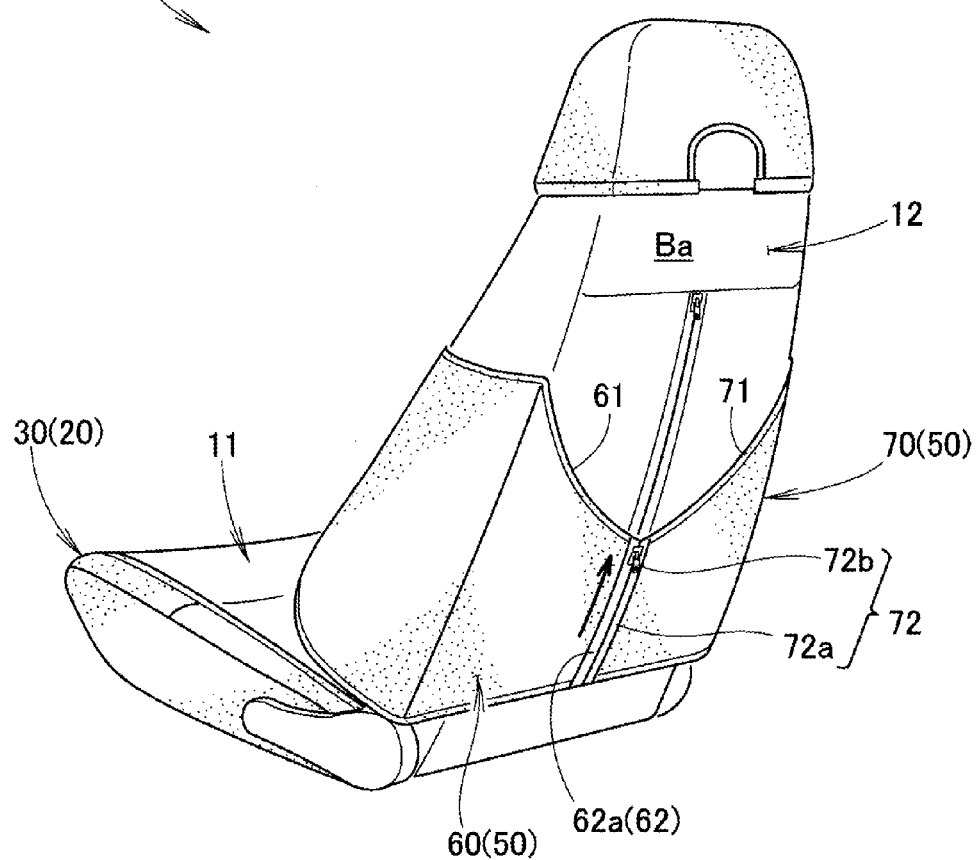

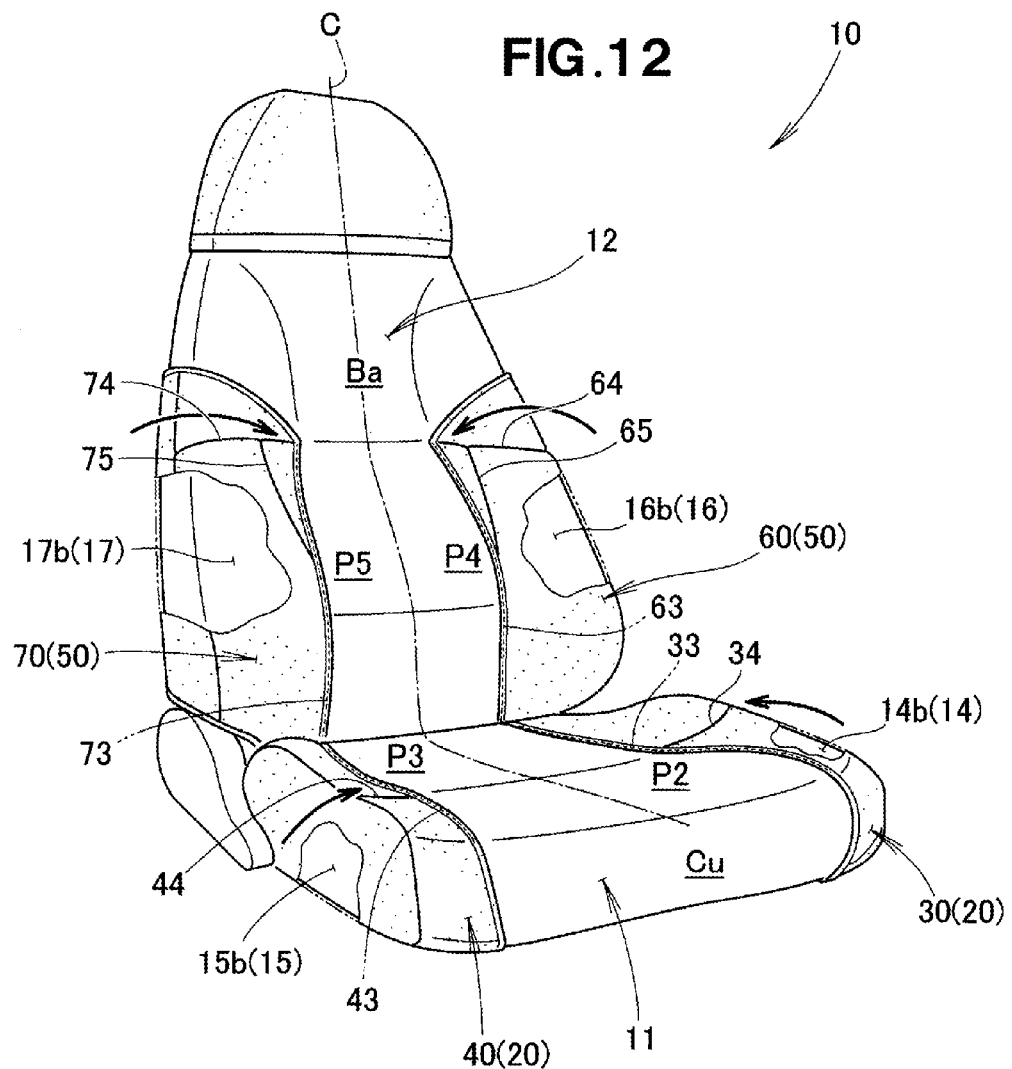

SIDE SUPPORT COVER

FIELD OF THE INVENTION

The present invention relates to an improvement in a side support cover for covering side supports projecting from lateral ends of a seat such as of a vehicle

BACKGROUND OF THE INVENTION

A seat for a passenger of a vehicle, for example, is comprised of a seat cushion and a seatback. The seat cushion is comprised of a seating part and cushion part sides support projecting upward from lateral ends of the seating part. The seatback is comprised of a backrest part and a seatback part side supports projecting forward from lateral ends of the backrest part. Each side support is provided to extend along a passenger body so as to keep a seated passenger in good or desired posture. The thus-explained seat is disclosed in JP 2014-000323 A, for example.

In the seat disclosed in JP 2014-000323 A, a cushion material is covered with a skin. The skin is held in tight contact with the cushion material.

However, prolonged-time use of such a seat causes certain problems. One problem is that the side supports opens outwardly in a seat width direction as a result of wear-out of the side supports. The skin often wears out due to the friction generated by repeated seating of the passenger on the seat.

SUMMARY OF THE INVENTION

It is therefore an object of the present invention to provide a technique whereby a side support cover with improved function and design feature is produced.

According to an aspect of the present invention, there is provided a side support cover adapted to be applied to a seat comprised of a seat cushion and a seatback, the seatback having a backrest part and left and right side supports projecting forward from respective left and right ends of the backrest part, the side support cover being for covering the left and right side supports, wherein the side support cover comprises a left and right cover bodies for covering the respective left and right side supports and left and right lace members with one ends fixed to the respective left and right cover bodies, the left and right lace members are connected to the left and right cover bodies at a fixation point located in the vicinity of boundaries between the backrest part and the side supports, the left and right cover bodies each includes high rigidity parts extending along the boundaries and having rigidity higher than that of other parts, the backrest part has left and right through-holes extending through the backrest part in a front-back direction thereof, and the left and right lace members are inserted and passed through the respective left and right through-holes from the front-back direction of the backrest part and tied together in such a state as applied with tension forces.

In the invention, as explained above, the left and right lace members are inserted into the through-holes passing through the backrest part and applied with tension forces. The cover bodies, to which the left and right lace members are fastened, pulled toward the backrest part. The left and right side supports, which are covered with the left and right cover bodies, are also pulled toward the backrest part. This enables correction of the degree of opening of the side supports as well as standing of the side supports (returning of the side supports to their original postures). It thus becomes possible to improve the deteriorated function of the side supports.

Even when they are applied to a new seat, opening or deformation of the left and right side supports 16, 17 can be prevented. In this sense, the function of the left and right side supports 16, 17 can be improved.

The left and right side supports are covered with the left and right cover bodies, respectively. Naturally, the skins of the left and right side supports that form parts of the left and right side supports are also covered with the left and right cover bodies. Thus, even when worn out parts exist in the skins, such worn out parts can be covered by the left and right cover bodies. By covering the worn out parts with the cover bodies, the design feature of the vehicular seat can be improved. The function and design feature of the left and right side supports can also be improved.

The left and right lace members are tied together on the back of the backrest part. As a result, tension application to the left and right lace members can be achieved with a single operation, whereby the pertinent operation can be effected with increased efficiency.

The left and right cover bodies are formed with the high rigidity parts which have rigidity higher than other parts thereof and extend from the point of connection of the left and right lace members outwardly in the seat width direction. By increasing the rigidity of the vicinity of the parts where the left and right lace members are fixed, it becomes possible to make the left and right cover bodies follow the left and right lace members easily. This further improves the function of the left and right side supports.

It is preferred that the left and right cover bodies be provided to extend from the vicinity of the boundaries up to a seat width center of a back of the backrest part, the left and right cover bodies have, at parts positioned at the seat width center of the back of the backrest part, respective left and right connection members, and the left and right cover bodies be connected together by means of the left and right connection members.

According to another aspect of the present invention, there is provided a side support cover adapted to be applied to a seat comprised of a seat cushion and a seatback, the seat cushion having a seating part and left and right side supports projecting upward from respective left and right ends of the seating part, the side support cover being for covering the left and right side supports, wherein the side support cover comprises a left and right cover bodies for covering the respective left and right side supports and left and right lace members with one ends connected to the respective left and right cover bodies, the left and right lace members are connected to the left and right cover bodies at a fixation point which is located in the vicinity of boundaries between the seating part and the side supports, the left and right cover bodies each includes high rigidity parts extending along the boundaries and having rigidity higher than that of other parts, the seating part has left and right through-holes extending through the seating part in a front-back direction thereof, and the left and right lace members are inserted and passed through the respective left and right through-holes from the front-back direction of the seating part and tied together in such a state as applied with tension forces.

In the thus-explained inventive arrangement, improved functions and advantageous effects similar to those explained in relation to the arrangement according to the one aspect of the invention can be provided.

It is preferred that the left and right cover bodies be provided to extend from the vicinity of the boundaries up to a seat width center of a back of the seating part, the left and right cover bodies have, at parts positioned at the seat width center of the back of the seating part, respective left and right connection members, and the left and right cover bodies be connected together by means of the left and right connection members.

BRIEF DESCRIPTION OF THE DRAWINGS

A preferred embodiment of the present invention will be described in detail below with reference to the accompanying drawings, in which:

FIG. 9 is a view illustrating the process for applying a tension to the lace member inserted into the through-hole shown in FIG. 8;

FIG. 10 is a view illustrating the process for closing a slide fastener on a back surface of a skin shown in FIG. 9;

FIG. 11 is a view illustrating the process for closing a fastening member of FIG. 10; and FIG. 12 is a view illustrating an operation of the vehicle seat of FIG. 1.

DETAILED DESCRIPTION OF THE PREFERRED EMBODIMENT

Throughout the discussion, the term "right and left" represents right and left directions as seen from a vehicle passenger while the term "front and rear" represents front and rear directions relative to the direction of travel of a vehicle.

Figure 1:
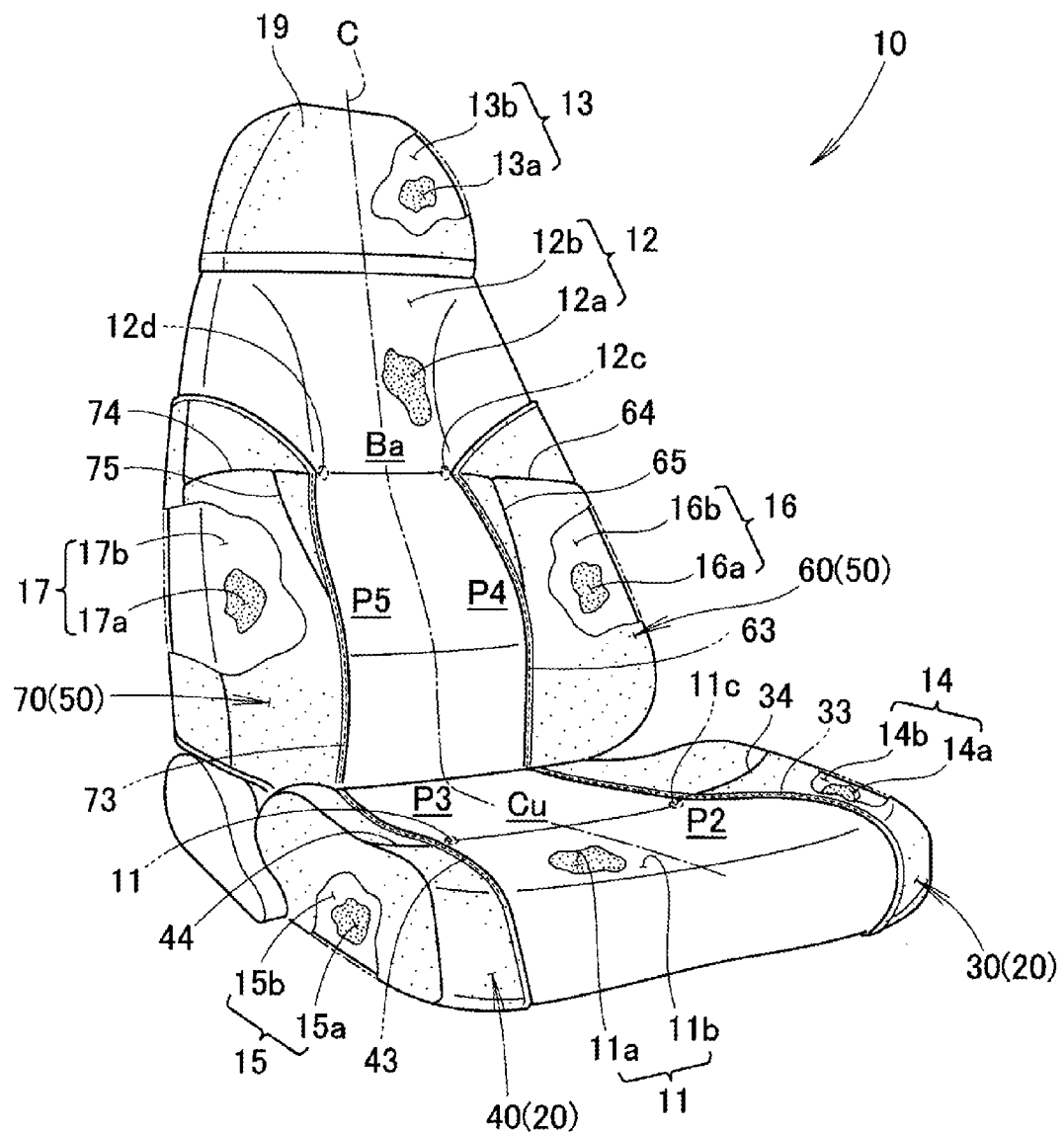
FIG. 1 is a perspective view illustrating a vehicular seat employing a side support cover according to an embodiment of the present invention.
Figure 2:
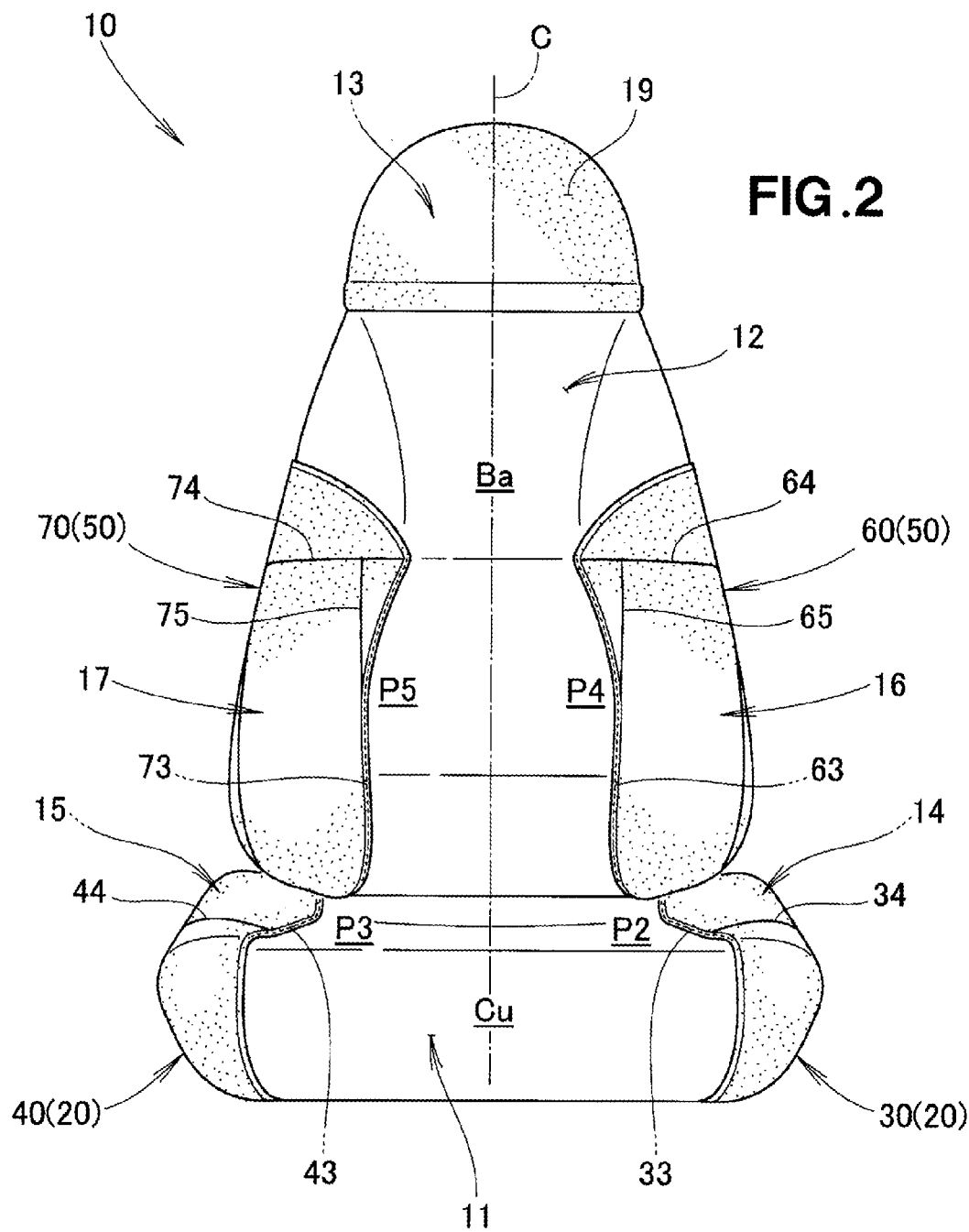
FIG. 2 is a front elevational view illustrating the vehicular seat of FIG. 1.
Figure 3:
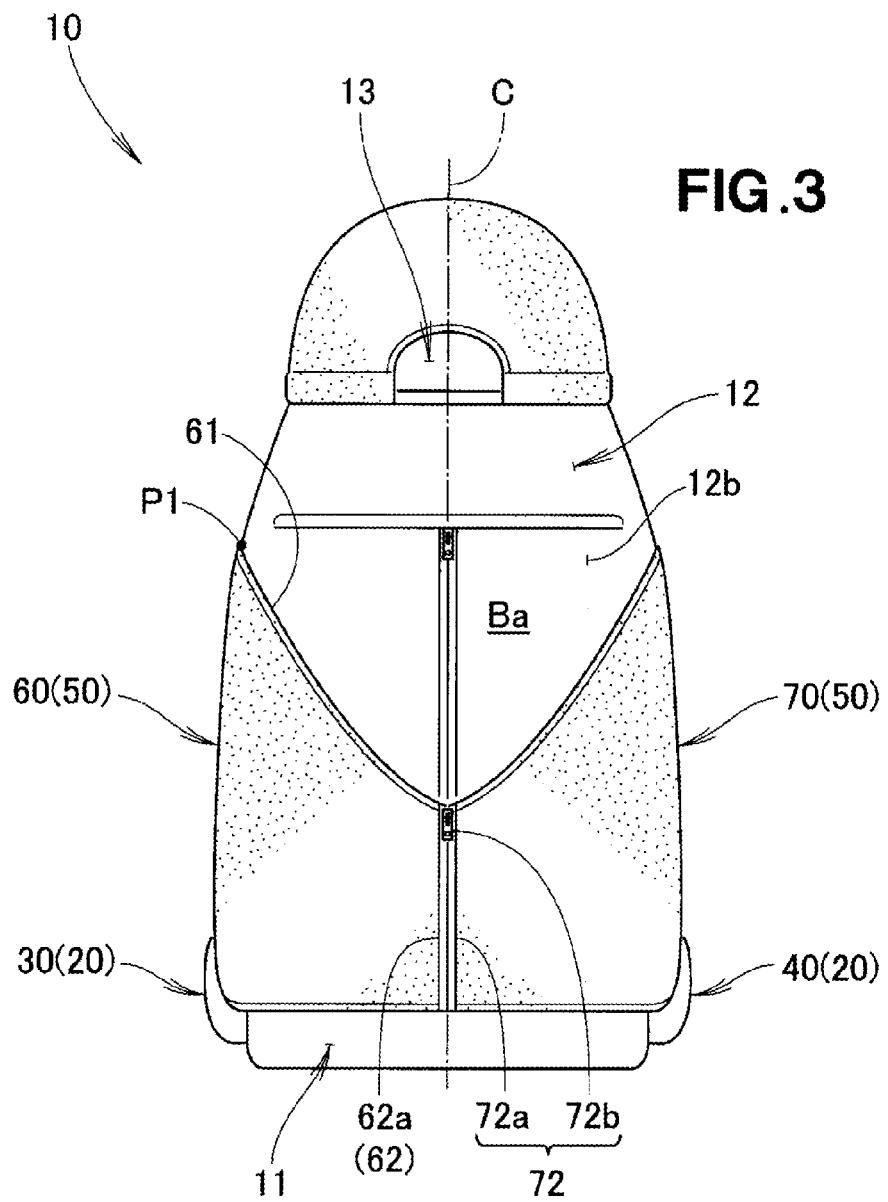
FIG. 3 is a rear elevational view illustrating the vehicular seat of FIG. 1.

Referring now to FIG. 1 through 3, the present invention is applied to a vehicle driver's seat, for example. A vehicle seat 10 is comprised of a seating part 11 for allowing a passenger to sit on, a backrest part 12 rising from a rear end of the seating part 11 and swingable back and forth (in a front-and-rear direction), a headrest 13 secured to an upper end of the backrest part 12, left and right cushion part side supports 14, 15 formed integrally with and rising from left and right ends of the seating part 11, and left and right seatback part side supports 16, 17 formed integrally with and extending forward from left and right ends of the backrest part 12.

A seat cushion part. Cu is comprised of the seating part 11 and the left and right cushion part side supports 14, 15. A seatback Ba is comprised of the backrest part and the left and right seatback part side supports 16, 17.

The left and right cushion part side supports 14, 15 are covered with a cushion part side support cover 20. The left and right seatback part side supports 16, 17 are covered with a seatback part side support cover 50. The headrest 13 is covered with a headrest cover 19.

The seating part 11 is comprised of a cushion material 11a and a skin 11b covering the cushion material 11a. Other parts are similarly configured. That is, cushion materials 12a, 13a, 14a, 15a, 16a, 17a are covered with skins 12b, 13b, 14b, 15, 16b, 17b.

Figure 4:
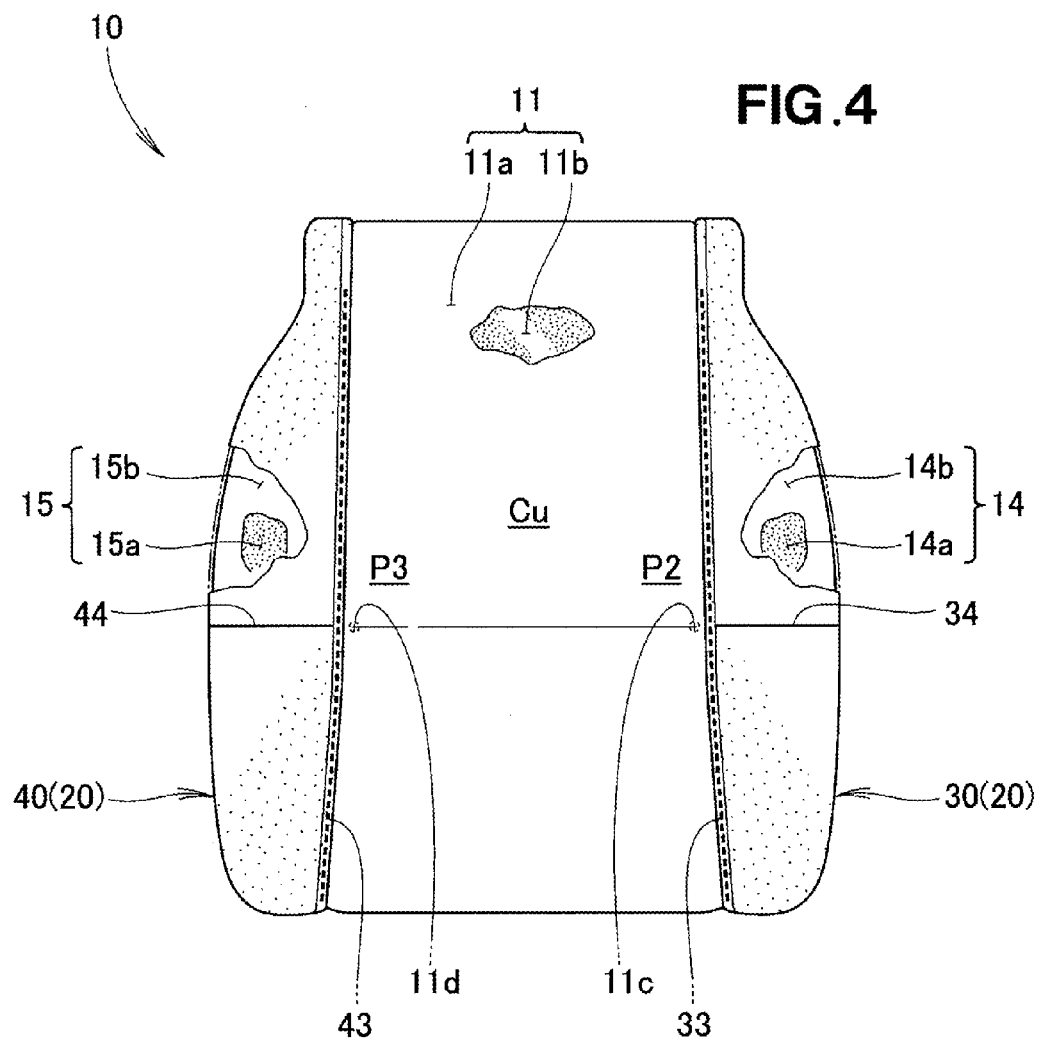
FIG. 4 is a top plan view illustrating a seat cushion of FIG. 1.
Figure 5:
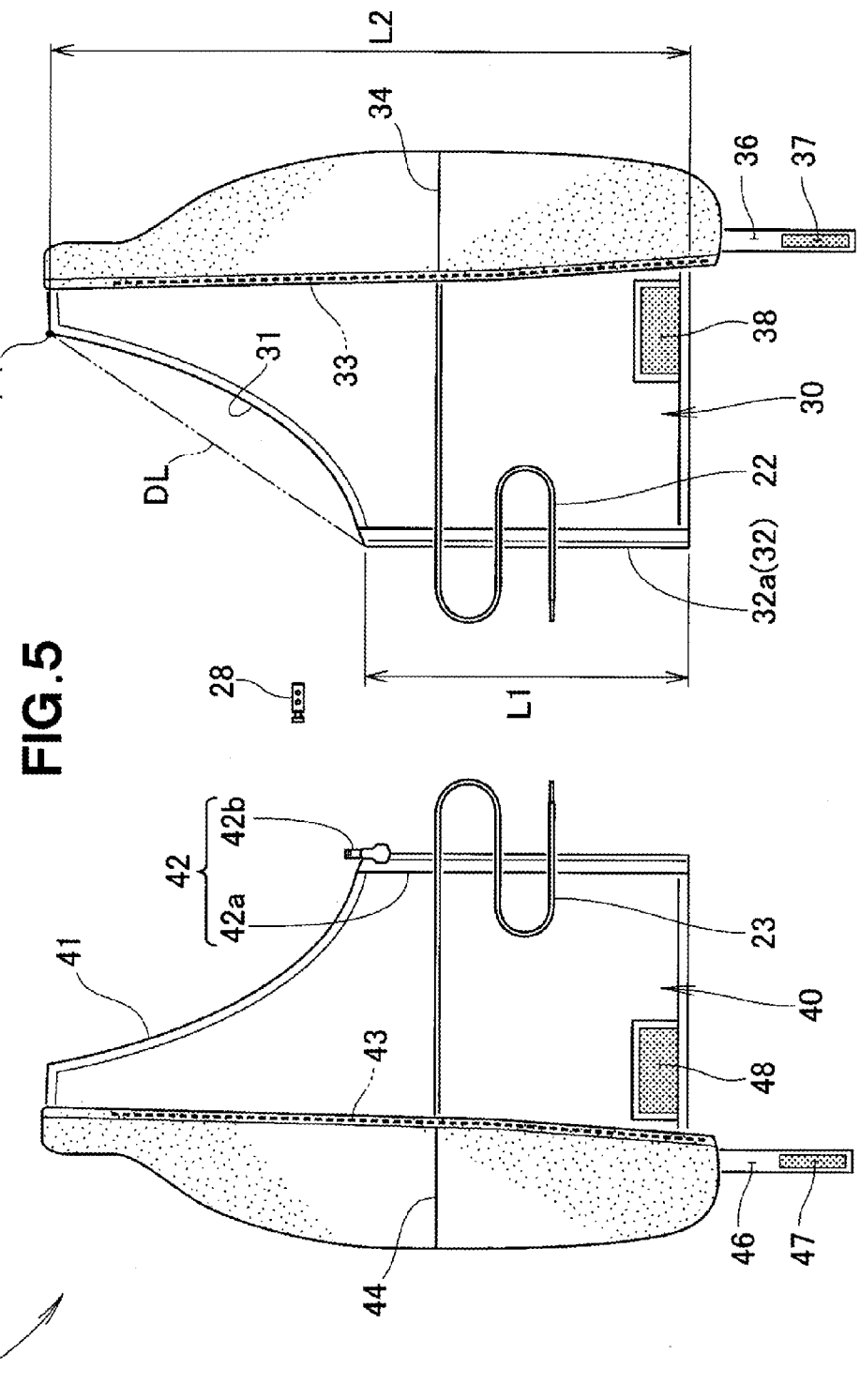
FIG. 5 is an exploded view illustrating a side support cover for a cushion part of FIG. 4.

Referring now to FIGS. 4 and 5, the cushion part side support cover 20 will be described in detail. The cushion part side support cover 20 is comprised of left and right cover bodies 30, 40 covering the respective left and right cushion part side supports 14, 15, left and right lace members 22, 23 with one end secured to the respective cover bodies 30, 40, and a shoe lace stopper 28 adapted to be connected to the left and right lace members 22, 23. As a material for the left and right cover bodies 30, 40, a known material such as artificial leather may be adopted.

The left cover body 30 covers the left cushion part side support 14 in its entirety and extends up to a seat width center C (see FIG. 3) of a back of the seating part 11.

Length of that part of the left cover body 30 which is opposed to the back of the seating part 11 becomes smaller continuously from one point P1 on a seat width outer side up to the seat width center C. Thus, length L1 of that part of the left cover body 30 at the seat width center C is smaller than length L2 of that part of the left cover body 30 at the seat width outer side. Part of the left cover body 30 between the one point P1 at the seat width outer side and the seat width center C is curved to provide a curved part 31. The curved part 31 is curved outwardly of a vehicle width relative to a phantom line (dashed line) DL that passes over the one point P1 on the seat width outer side and the seat width center C.

A left connection member 32, which is adapted to be connected to the right cover body 40, is attached to that part of the left cover body 30 which is positioned at the seat width center C on the back of the seating part 11. The left connection member 32 is formed of a fastener stringer 32a.

A wire 33 is provided at that part of the left cover body 30 which is positioned proximately to a boundary or perimeter P2 between the seating part 11 and the left cushion part side support 14. The wire 33 is accommodated in that part of an end of the left cover body 30 which is close to the boundary P2 and sewn into a bag or pouch form. The part in which the wire 33 is accommodated has increased rigidity compared to other parts of the left cover body 30. The thus-explained part is provided to extend along the boundary P2. The wire 33 may also be regarded as a high-rigidity part 33 that extend along the boundary P2.

Distal end of the left lace member 22 is secured to that part of the left cover body 30 which is positioned closely to the boundary P2. Part 34 of high rigidity is provided to extend outwardly in a seat width direction from the part to which the distal end of the left lace member 22 is secured. Hereinafter, the part 34 of high rigidity will be called the high rigidity part 34 extending in the seat width direction. The high rigidity part 34 extending in the seat width direction is formed of two sheets of artificial leather laid one over the other and sewn together. For a reason explained below, the high rigidity part 34 extending in the seat width direction desirably has rigidity higher than that of a general part (unsewn part) of the left cover body 30.

A belt member 36 is sewn to a front end of that part of the left cover body 30 which is positioned close to the boundary P2. A first hook-and-loop fastener 37 is sewn to the belt member 36. A second hook-and-loop fastener 38 is sewn to a front end of that part of the left cover body 30 which is opposed to the back of the seating part 11. For laying the left cover body 30 over the left cushion part side support 14, the belt member 36 is pulled toward the back side of the seating part 11, followed by connecting the first hook-and-loop fastener 37 with the second hook-and-loop fastener 38.

The right cover body 40 has a basic constitution similar to that of the left cover body 30. Namely, a curved part 41 is provided to that part of the right cover body 40 which is opposed to the back of the seating part 11.

A right connection member 42, which is adapted to be connected to the left cover body 40, is attached to that part of the right cover body 40 which is positioned at the seat width center C on the back of the seating part 11. The right connection member 42 is formed of a fastener stringer 42a and a slider 42b.

A wire 43 is provided at that part of the right cover body 40 which is positioned closely to a boundary P3, so as to extend in a front-rear direction. The wire 43 forms a high rigidity part 43 extending along the boundary P3.

Distal end of the right lace member 23 is secured to that part of the right cover body 40 which is located closely to the boundary P3. From the part to which the distal end of the right lace member 23, a high rigidity part 44 extends outward in the seat width direction along the latter.

A belt-shaped belt member 46 is sewn to a front end of that part of the right cover body 40 which is located closely to the boundary P3. A first hook-and-loop fastener 47 is sewn to the belt member 46. A second hook-and-loop member 48 is sewn to a front end of that part of the right cover body 40 which is opposed to the back of the seating part 11.

At parts proximate to the left and right boundaries P2, P3, the seating part 11 have through-holes 11c, 11d extending through the seating part 11 in a front-back direction. The left and right lace members 22, 23 are passed through the respective left and right through-holes 11c, 11d and applied with tension forces. On applying the tension forces, the shoe lace stopper 28 is utilized. A mode of applying the tension forces will be discussed later.

Figure 6:
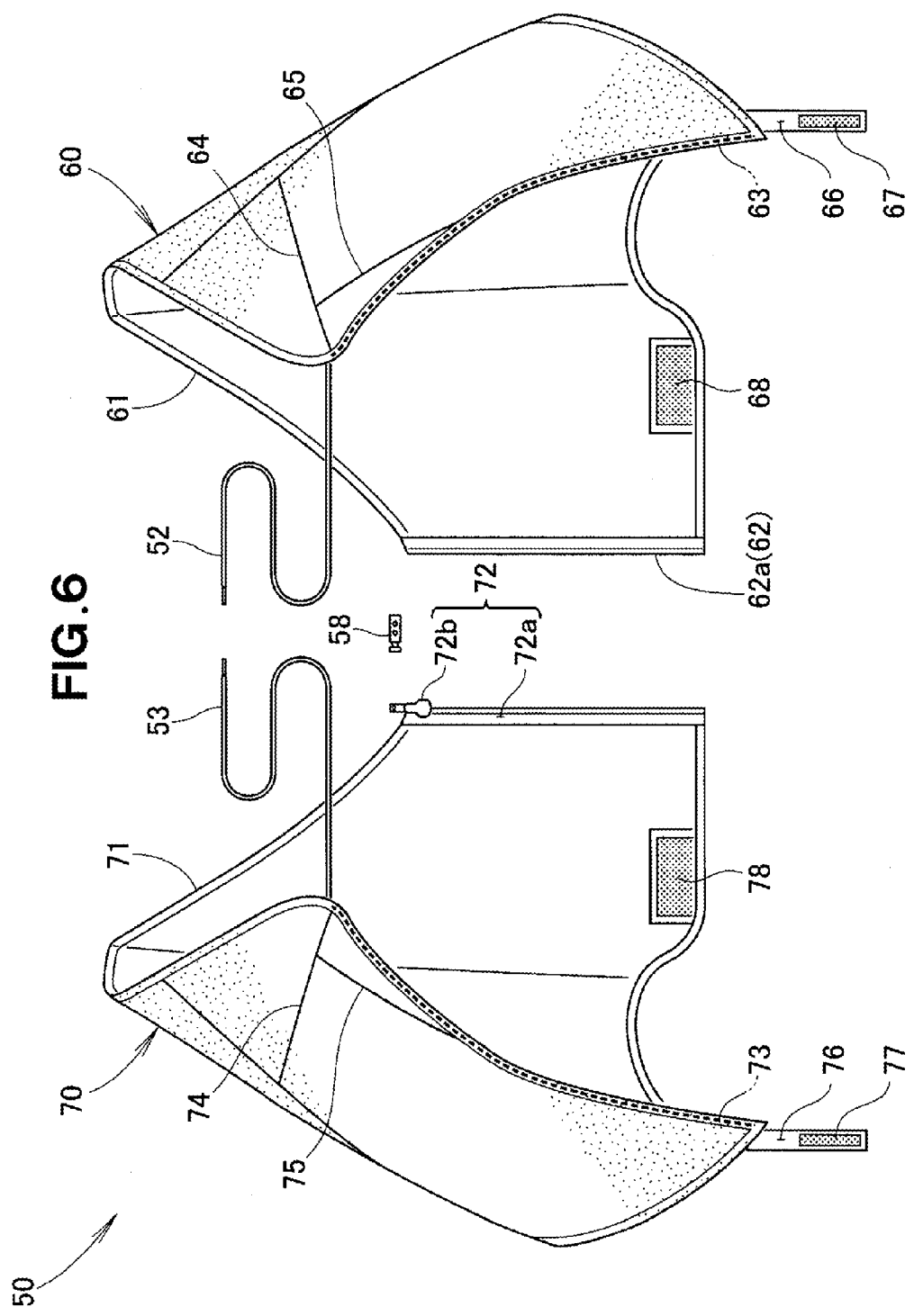
FIG. 6 is an exploded view illustrating a side support cover for a seatback part of FIG. 1.

Reference is now made to FIG. 6 in conjunction with FIGS. 2 and 3. Detailed discussion will be made as to a seatback part side support cover 50. The seatback part side support cover 50 is also configured basically similarly to the cushion part side support cover 20.

The seatback part support cover 50 is comprised of left and right cover bodies 60, 70 for covering the respective left and right seatback part side supports 16, 17, left and right lace members 52, 53 having one ends secured to the respective left and right cover bodies 60, 70, and a shoe lace stopper 58 adapted to be mounted to the left and right lace members 52, 53.

The left cover body 60 is laid over the left seatback part side support 16 in its entirety and extends as far as the seat width center C of the back of the backrest part 12.

At a part opposed to the back of the backrest part 12, the left cover body 60 has a curved part 61.

A connection member 62, which is adapted to be connected to the right cover body 70, is mounted to that part of the left cover body 60 which is located at the seat width center C of the back of the backrest part 12. The left connection member 62 includes a fastener stringer 62a.

The left cover body 60 has, at a part located proximately to a boundary P4 between the backrest part 12 and the left seatback part side support 16, a wire 63 extending vertically. The wire 63 is accommodated in that part of an end of the left cover body 60 which is close to the boundary P4 and sewn into a bag or pouch form. The part in which the wire 63 is accommodated has increased rigidity compared to other parts of the left cover body 60. The thus-explained part is provided to extend along the boundary P2. The wire 63 may also be regarded as a high-rigidity part 63 that extend along the boundary P4.

The left cover body 60 has a left lace member 52 with a distal end secured to a part thereof which is proximate to the boundary P4. From the part to which the distal end of the left lace member 52, a high rigidity part 64 extends in the seat width direction. The high rigidity part 64 extending in the seat width direction is equivalent to the high rigidity part 34 of the left cover body 30.

A high rigidity part 65 is formed to extend substantially vertically downwardly from the high rigidity part 64 extending in the seat width direction. The seatback part side support cover 50 differs from the cushion part side support cover 20 in that the former has the vertically-extending high rigidity part 65. The vertically-extending high rigidity part 65 extends as low as the vicinity of the high rigidity part 63 extending along the boundary P4. Namely, the vertically-extending high rigidity part 65 has a lower end that reaches the vicinity of the high rigidity part 63 extending along the boundary P4. The vertically-extending high rigidity part 65 is also formed of two sheets of artificial leather laid one over the other and sewn together. The vertically-extending high rigidity part 65 has rigidity higher than that of a general part (unsewn part).

A belt-shaped belt member 66 is sewn to a lower end of that part of the left cover body 60 which is positioned closely to the boundary P4. A first hook-and-loop fastener 67 is sewn to the belt member 66. A second hook-and-loop fastener 68 is sewn to a lower end of that part of the left cover body 60 which is opposed to the back of the backrest part 12. For laying the left cover body 60 over the left seatback part side support 16, the belt member 66 is pulled toward the back of the backrest 12 and then the first hook-and-loop fastener 67 is caused to be coupled with the second hook-and-loop fastener 68.

The right cover body 70 is configured basically similarly to the left cover body 60. Namely, a curved part 71 is provided to that part of the right cover body 70 which is opposed to the back of the backrest part 12.

A right connection member 72, which is adapted to be connected to the left cover body 60, is mounted to that part of the right cover body 70 which is positioned at the seat width center of the back of the backrest part 12. The right connection member 72 is comprised of a fastener stringer 72a and a slider 72b.

The right cover body 70 has, at a part in the vicinity of a boundary P5, a wire 73 extending vertically. The wire 73 provides a high rigidity part 73 extending along the boundary P5.

Distal end of the right lace member 53 is secured to that part of the right cover body 70 which is positioned in the vicinity of the boundary P5. From the part to which the distal end of the right lace member 53 is secured, extends a high rigidity part 74 outward in the seat width direction (seat-width-direction high rigidity part 74).

From the seat-width-direction high rigidity part 74, a high rigidity part 75 extends substantially vertically downward. The vertically-extending high rigidity part 75 extends as low as the vicinity of the wire 73. In other words, the vertically-extending high rigidity part 75 has a lower end that reaches the vicinity of the high rigidity part 73 extending along the boundary P5.

A belt-shaped belt member 76 is sewn to a lower end of a part positioned in the vicinity of the boundary P5. A first hook-and-loop fastener 77 is sewn to the belt member 76. A second hook-and-loop fastener 78 is sewn to a lower end of that part of the right cover body 70 which is opposed to the back of the backrest part 12.

Left and right through-holes 12c, 12d (see FIG. 1) are provided at that part of the backrest part 12 which is located in the vicinity of the left and right boundaries P4, P5 so as to extend through the backrest part 12 in the front-back direction. The left and right lace members 52, 53 are passed through the respective left and right through-holes 12c, 12d and applied with tension forces. For applying the tension forces, a shoe lace stopper 58 is utilized Discussion will be made now as to a mode for mounting the seatback part side support cover 50 to the left and right seatback part side supports 16, 17. The cushion part side support cover 20 is mounted to the left and right cushion part side supports 14, 15 in a basically similar manner. That is, the backrest part (seatback part) can be regarded as a seating part (seat cushion part or cushion part). Thus, its description will be omitted.

Hereinafter, the left and right seatback part side supports 16, 17 will be called "left and right side support 16, 17" while the seatback part side support cover 50 will be called "side support cover 50" for simplicity.

Figure 7:
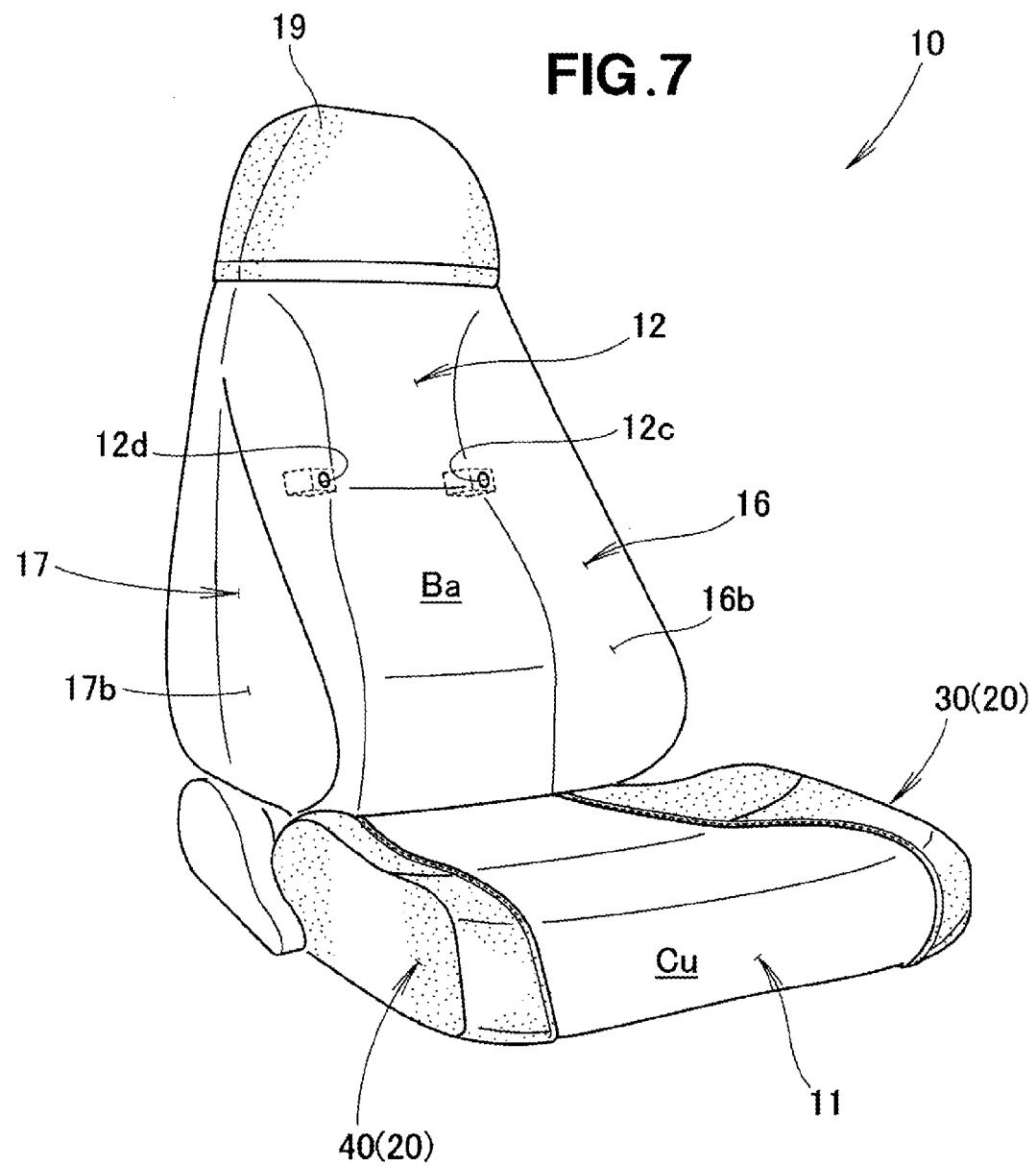
FIG. 7 is a perspective view illustrating the vehicular seat before the seatback part side support cover of FIG. 4 is mounted thereto.
Figure 8:
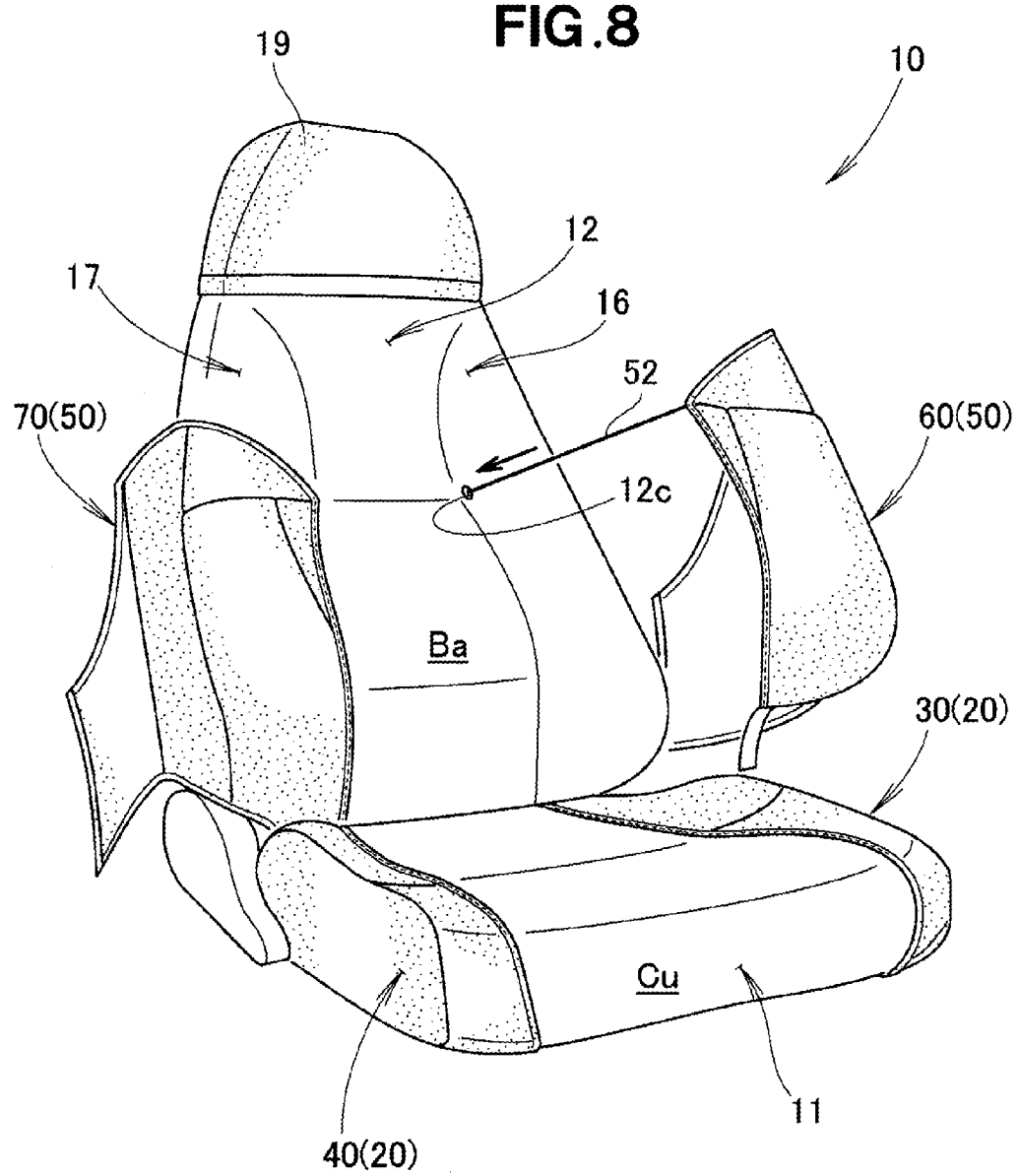
FIG. 8 is a view illustrating the process for inserting a lace member into a through-hole in the vehicle seat of FIG. 7.

Reference is now made to FIGS. 7 and 8. Firstly, the left and right side supports 16, 17 are laid over the left and right cover bodies 60, 70. For laying the left and right cover bodies 60, 70 over the left and right lace members 52 (only left lace member 52 is shown) are inserted into the respective left and right through-holes 12c, 12d from the front to the back of the backrest part 12.

Turning now to FIG. 9, with a button of the shoe lace stopper 58 being pressed, the left and right shoe laces 52, 53 positioned on the back side of the backrest part 12 are passed through the shoe lace stopper 58. With the button of the shoe lace stopper 58 being pressed, the shoe lace stopper 58 is caused to advance toward the back of the backrest part 12. At this time, the shoe lace stopper 58 is advanced up to a position where tension forces are applied to the left and right lace members 52, 53. Then, the button of the shoe lace stopper 58 is released to place the shoe lace stopper 58 in a fixed position. As a result, the left and right lace members 52, 53 remain tensioned. Further, the shoe lace members 52, 53 are tied together on the back side of the backrest part 12.

A mode for applying tension forces to the left and right lace members 52, 53 is not limited to the one wherein the shoe lace stopper 58 is utilized. Required tension forces can also be generated by tying the left and right lace members 52, 53 together. In this case also, the left and right lace members 52, 53 are tied together on the back of the backrest part 12.

When the backrest part 12 is seen from the back side, the left and right through-holes 12c, 12d respectively have a rectangular shape. This is because the left and right through-holes 12c, 12d are formed to utilize parts of left and right pull-in holes 12e, 12f. The left and right pull-in holes 12e, 12f are formed to allow the skins 12b, 16b, 17b to be pulled in from the front surface to the back surface of the seat 10 and to be fixed to a seat frame, not shown. That is, parts of the left and right through-holes 12c, 12d are formed by the pull-in holes 12e, 12f which in turn are formed to allow the skins 12b, 16b, 17b to be pulled in from the front surface to the back surface of the seat 10 and to be fixed to the seat frame.

The through-holes 12c, 12d are formed in the cushion material 12a of the backrest part 12 so as to enable mounting of the side support cover 50. Utilization of the parts of the known pull-in holes 12e, 12f facilitates an operation to form the left and right through-holes 12c, 12d. Note additionally that by forming the holes, rigidity decrease can be kept to a minimum.

Referring next to FIG. 10, after the left and right lace members 52, 53 (see FIG. 9) are applied with tension forces, the skin 12b is closed. Next, the first hook-and-loop fasteners 67, 77 (see FIG. 6) and the second hook-and-loop fasteners 68, 78 (see FIG. 6) are tied together.

Turning to FIG. 11, the slider 72b is slid upward to connect the left and right cover bodies 60, 70 together. This completes mounting of the side support cover 50 to the left and right side supports 16, 17 (see FIG. 1).

Reference is now made to FIG. 12 in conjunction with FIG. 6. Attachment of the side support cover 50 to the left and right side supports 16, 17 produces the following advantageous effects. Similar advantageous effects can be produced by attachment of the cushion part side support cover 20 to the left and right cushion part side supports 14, 15. Thus, discussion as to the first-mentioned attachment and the resulting advantageous effects can be regarded as that of the second-mentioned attachment and the advantageous effects resulting therefrom, as necessary and discussion as to the latter case is therefore omitted.

The left and right lace members 52, 53 are passed through the respective left and right through-holes 12c, 12d (see FIG. 7) via those parts of the backrest part 12 which are positioned proximately to the boundaries P4, P5 and are applied with tension forces. The left and right cover bodies 60, 70 are, with the left and right lace members 52, 53 secured thereto, pulled toward the backrest part 12. The left and right side supports 16, 17, which are covered with the respective left and right cover bodies 60, 70 are also pulled toward the backrest part 12. This corrects the degree of opening of the left and right side supports 16, 17 and enables the left and right side supports 16, 17 to stand (to return the left and right side supports 16, 17 back into their original postures). In other words, it becomes possible to increase the reduced function of the left and right side supports 16, 17. Even when they are applied to a new seat, opening or deformation of the left and right side supports 16, 17 can be prevented. In this sense, the function of the left and right side supports 16, 17 can be improved.

The left and right side supports 16, 17 are covered with the left and right cover bodies 60, 70, respectively. Naturally, the skins 16b, 17b of the left and right side supports (see FIG. 1) that form parts of the left and right side supports 16, 17 are also covered with the left and right cover bodies 60, 70. Even when worn out parts exist in the skins 16b, 17h, such worn out parts can be covered by the left and right cover bodies 60, 70. By covering the worn out parts with the cover bodies 60, 70, design level of the vehicular seat 10 can be increased.

As can be appreciated from the above discussion, the function and design of the left and right side supports 16, 17 can be improved.

The side support cover 50 is not laid over the backrest part 12. In other words, provided is the cover which is adapted to be applied to only those parts where the function and design are liable to deteriorate. As a result, it becomes possible to mend only those parts where mending is required, keeping the original seat design. Compared to the mending of the seat in its entirety, significant mending cost reduction is enabled.

The left and right cover bodies 60, 70 are connected together at the seat width center C via the left and right connection members 62, 72 on the back of the backrest part 12. This increases the shape correction function of the left and right side supports 16, 17.

The left and right lace members 52, 53 are tied together on the back of the backrest part 12. As a result, tension application to the left and right lace members 52, 53 can be achieved with a single operation, whereby the pertinent operation can be effected with increased efficiency.

The left and right cover bodies 60, 70 are formed with the high rigidity parts 64, 74 which have rigidity higher than other parts thereof and extend from the point of connection of the left and right lace members 52, 53 outwardly in the seat width direction. By increasing the rigidity of the vicinity of the parts where the left and right lace members 52, 53 are fixed, it becomes possible to make the left and right cover bodies 60, 70 follow the left and right lace members 52, 53 easily. This further improves the function of the left and right side supports 16, 17.

The left cover body 60 has, at the part located close to the boundary P4, the high rigidity part 63 extending along the boundary P4. This enables the left and right cover bodies 60, 70 to easily follow the left and right lace members 52, 53. As a result, the left and right cover bodies 60, 70 can be brought tight against the backrest part 12. This also improves the design feature of the vehicular seat 10.

Note additionally that the left and right cover bodies 60, 70 are provided with the curved parts 61, 71 at their parts positioned on the back of the backrest part 12, the curved parts 61, 71. By virtue of the curved shape of the curved parts 61, 71, the left and right cover bodies 60, 70 can be brought against the backrest part 12 with increased tightness.

Although discussion has thus far been made as to the invention as applied to a vehicle driver's seat, the invention may also be applied to a front passenger seat, back or rear seats and child seats. The invention may also be applied to seats of a bus, an airplane and other like passenger vehicles. The invention may further be applied to seats other than vehicular seats, e.g., legless chairs. To sum up, the invention is not limited to applications to the mentioned seats and chairs but is also suitable for other applications as long as the same functions and results are obtained.

The left and right lace members have been explained thus far in relation to an example wherein belt members are provided to the opposite ends thereof. In place of the belt members, lace members may be used, in which instance separate through-holes may be formed in the backrest part or the seating part.

The side support cover mounting structure according to the present invention is suitable for use on vehicular seats.

Obviously, various minor changes and modifications of the present invention are possible in light of the above teaching. It is therefore to be understood that within the scope of the appended claims the invention may be practiced otherwise than as specifically described.

What is claimed is:

1. A side support cover applied to a seat, wherein the seat comprises a seat cushion and a seatback; a front of the seatback comprises a backrest part and left and right side supports projecting forward from respective left and right ends of the backrest part; and the side support cover configured to cover the left and right side supports of the seatback, wherein the side support cover comprises a left and right cover bodies configured to cover the respective left and right side supports and left and right lace members with one ends secured to the respective left and right cover bodies, the left and right lace members are connected to the left and right cover bodies at a point of connection located in a vicinity of boundaries between the backrest part and the side supports, the left and right cover bodies each includes high rigidity parts extending along the boundaries and having rigidity higher than that of other parts of the left and right cover bodies, the backrest part comprises left and right through-holes extending through the backrest part in a front-back direction thereof, and the left and right lace members are inserted to pass through the respective left and right through-holes from the front-back direction of the backrest part and tied together on the back of the seatback in such a state as applied with tension forces.

2. The side support cover of claim 1, wherein the left and right cover bodies are provided to extend from the vicinity of the boundaries up to a seat width center of a back of the backrest part, the left and right cover bodies have, at parts positioned at the seat width center of the back of the backrest part, respective left and right connection members, and the left and right cover bodies are connected together by means of the left and right connection members.

3. A side support cover applied to a seat, wherein the seat comprises a seat cushion and a seatback; a front of the seat cushion comprises a seating part and left and right side supports projecting upward from respective left and right ends of the seating part; and the side support cover configured to cover the left and right side supports of the seatback, wherein the side support cover comprises a left and right cover bodies configured to cover the respective left and right side supports and left and right lace members with one ends secured to the respective left and right cover bodies, the left and right lace members are connected to the left and right cover bodies at a point of connection located in a vicinity of boundaries between the seating part and the side supports, the left and right cover bodies each includes high rigidity parts extending along the boundaries and having rigidity higher than that of other parts of the left and right cover bodies, the seating part comprises left and right through-holes extending through the seating part in a front-back direction thereof, and the left and right lace members are inserted to pass through the respective left and right through-holes from the front-back direction of the seating part and tied together on the back of the seat cushion in such a state as applied with tension forces.

4. The side support cover of claim 3, wherein the left and right cover bodies are provided to extend from the vicinity of the boundaries up to a seat width center of a back of the seating part, the left and right cover bodies have, at parts positioned at the seat width center of the back of the seating part, respective left and right connection members, and the left and right cover bodies are connected together by means of the left and right connection members.

\* \* \* \* \*